United States Patent [19]

Tsukada

[11] Patent Number: 5,072,348
[45] Date of Patent: Dec. 10, 1991

[54] VEHICLE LAMP
[75] Inventor: Hiroyuki Tsukada, Isehara, Japan
[73] Assignee: Ichikoh Industries, Ltd., Tokyo, Japan
[21] Appl. No.: 696,786
[22] Filed: May 7, 1991
[30] Foreign Application Priority Data May 8, 1990 [JP] Japan .............................. 2-47413[U]
May 8, 1990 [JP] Japan .............................. 2-47414[U]

[51] Int. Cl.$^5$ .......................................... H01R 33/00
[52] U.S. Cl. .................................... 362/226; 362/61; 362/267; 362/294
[58] Field of Search ................... 362/61, 80, 226, 267, 362/310, 294

[56] References Cited

U.S. PATENT DOCUMENTS

4,390,931 6/1983 Gorick et al. ...................... 362/267
4,755,917 7/1988 Bals et al. ........................... 362/267
4,907,134 3/1990 Mori ..................................... 362/61
4,926,301 5/1990 Liverance et al. .................. 362/226

Primary Examiner—Stephen F. Husar
Attorney, Agent, or Firm—Foley & Lardner

[57] ABSTRACT

In a vehicle lamp comprising a housing having a reflector formed integrally therewith, a bulb holder fitted in the rear opening of the housing, a lamp bulb detachably installed in the bulb holder, and a cap covering the rear opening of the housing and the connection of the lead wires of the lamp bulb, the provision of engaging parts for attachment of the cap on the bulb holder negates the need for engaging members on the housing. Thus, no undercut has to be formed in the housing, which facilitates the molding of the housing. Also, the heat radiator provided on the bulb holder reduces the difference in temperature between the lamp chamber and the outside of the vehicle lamp, thereby preventing condensation from taking place inside the vehicle lamp and also allowing the design of a more compact lamp chamber, and in turn, a smaller vehicle lamp volume.

8 Claims, 10 Drawing Sheets

VEHICLE LAMP

BACKGROUND OF THE INVENTION a) Field of the Invention

The present invention relates to a vehicle lamp, and more particularly, to a vehicle lamp comprising a housing having a reflector formed integrally therewith, a bulb holder fitted in the rear opening of the housing, a lamp bulb detachably installed in the bulb holder, and a cap covering the rear opening of the housing and the connection of the lead wires of the lamp bulb.

b) Description of the Prior Art

The vehicle lamps of this kind are known from, for example, the U.S. Pat. No. 4,755,917 and in FIG. 9B (Prior Art) of the U.S. Pat. No. 4,907,134.

In such vehicle lamps, the cover cap is secured to the housing by engaging an engaging projection formed along the outer circumference of the rear opening of the housing into an engaging groove formed in the opening end of the cap (as in the U.S. Pat. No. 4,755,917) or by engaging an engaging projection formed along the inner opening of the opening end of the cap into an engaging groove formed along the outer circumference of the rear of the housing (as in the U.S. Pat. No. 4,907,134).

In the above-mentioned vehicle lamps, however, an engaging projection or groove is formed in the housing for securing the cover cap thereto. Thus, the housing has a resultant undercut, which makes it difficult to mold the housing.

SUMMARY OF THE INVENTION

The present invention has an object to provide a vehicle lamp in which the housing has as no undercut and therefore is easy to mold.

The above object is attained by providing a vehicle lamp comprising, according to the present invention, a housing having a reflector formed integrally therewith, a bulb holder fitted in the rear opening of the housing, a lamp bulb detachably installed in the bulb holder, and a cap covering the rear opening of the housing and the connection of the lead wires of the lamp bulb, the bulb holder having engaging parts for attaching the cap.

Because the engaging parts are provided on the bulb holder, the vehicle lamp according to the present invention has no necessity of providing, on the housing, the engaging parts for attaching the cap. Thus, the housing has no undercut, which facilitates the molding of the housing.

The present invention has another object to provide a vehicle lamp having at the bulb holder a heat radiator to minimize the difference between the temperature in the lamp chamber and that outside the lamp, thereby preventing condensation and thus permitting a reduction of the volume of the lamp chamber, and in turn, the vehicle chamber volume.

DETAILED DESCRIPTION OF THE PREFERRED EMBODIMENTS

One embodiment of the vehicle lamp according to the present invention will be described below with reference to FIGS. 1 to 12.

In the Figures, a housing having a reflector formed integrally therewith is generally indicated with a reference numeral 1. The housing 1 is made of a thermo-setting compound such as BMC (=bulk molding compound, containing unsaturated polyester resin, an oxide (or hydroxide) of a bivalent metal like magnesia or the like and a glass fiber), which is not easily heat-deformable.

Figure 1:
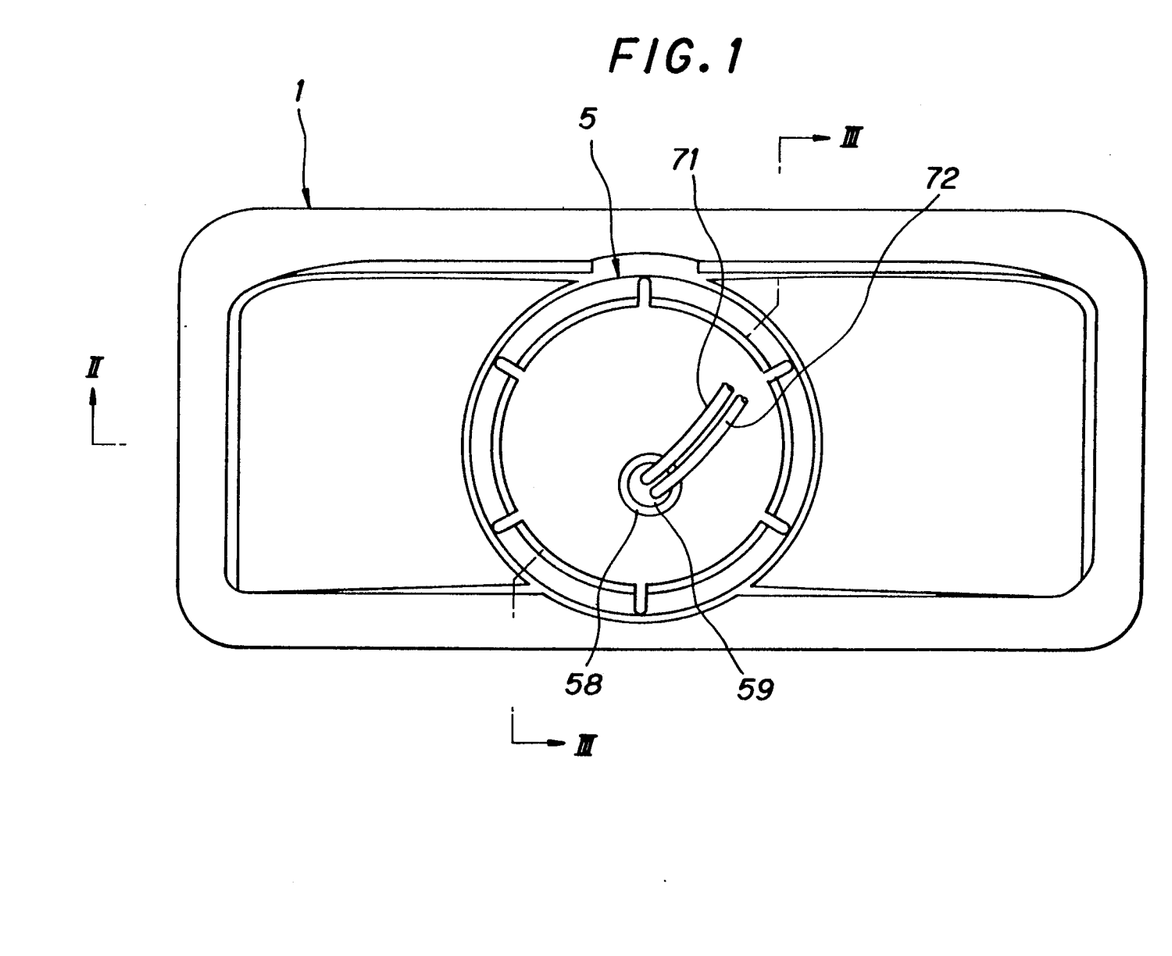
FIG. 1 is a rear view showing one embodiment of the vehicle lamp according to the present invention.
Figure 2:
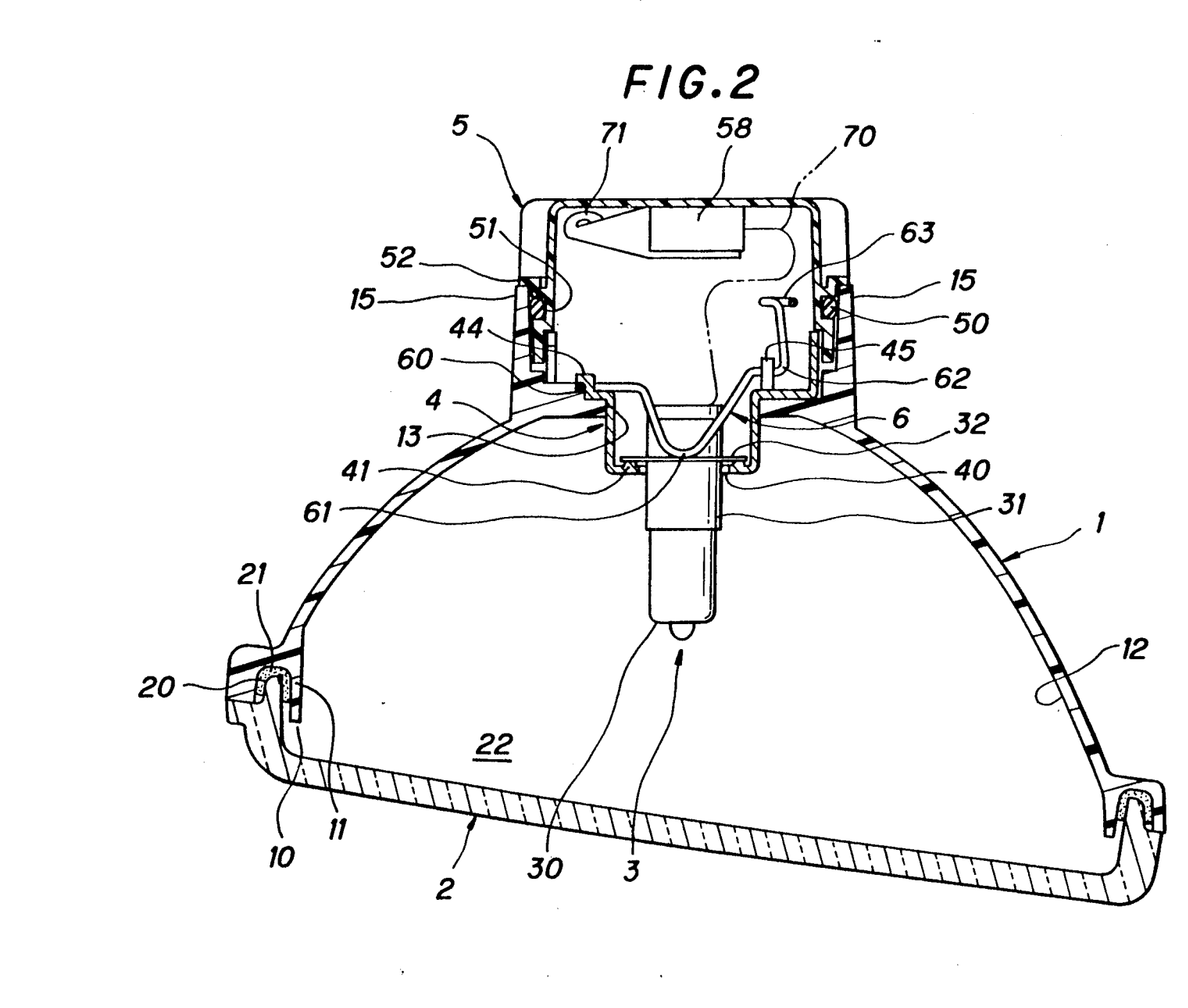
FIG. 2 is a schematic sectional view taken along the line II—II in FIG. 1.
Figure 3:
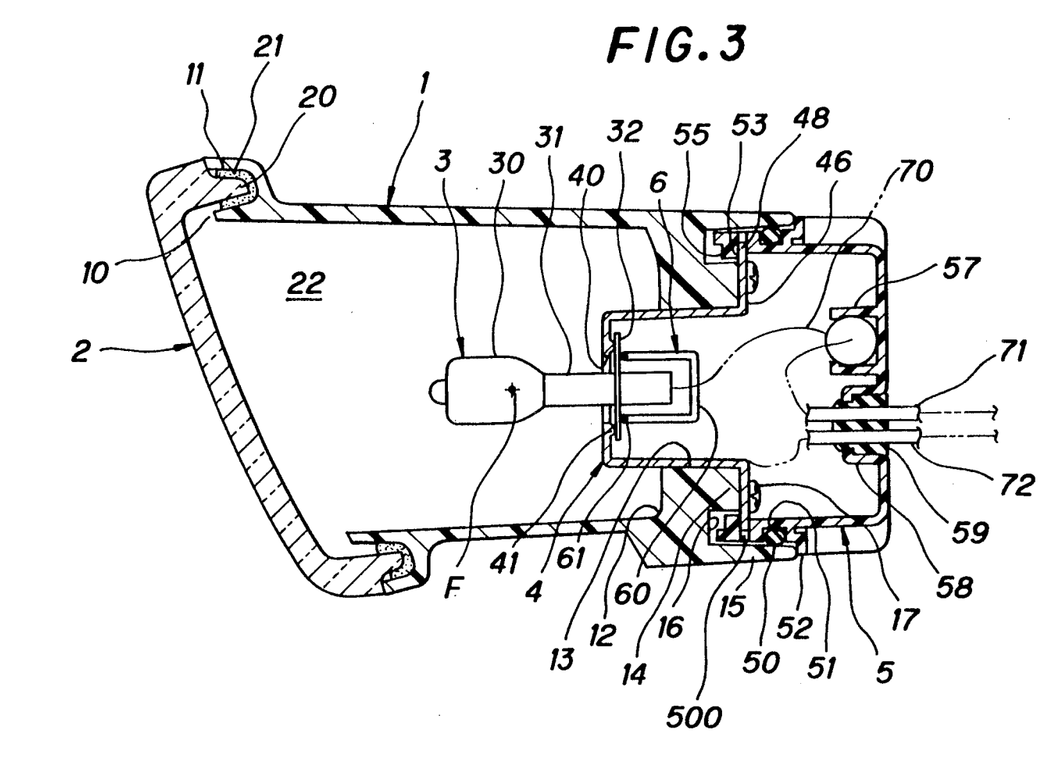
FIG. 3 is a schematic sectional view taken along the III—III in FIG. 1.

As seen in FIGS. 2 and 3, the housing 1 has an opening 10 formed at the front thereof where a lens 2 (which will be described later) is disposed. A receiving and sealing groove 11 is formed in the entire rim of the housing 1 along the circumference of the opening 10. Also there is coated, by evaporation, on the inner surface of the housing 1 a reflecting surface 12 having, for example, a shape of paraboloid revolution. Thus, the housing 1 has a reflector formed integrally therewith. Furthermore, a fixing opening 13 is formed in the center of the housing 1 at the rear portion thereof. As shown in FIG. 3, there is provided integrally along the circumferential edge of the fixing opening 13 of the housing 1 a projection 14 protruding backward and to which a bulb holder 4 (which will be described later) is fixed. Also, there is provided integrally outside the fixing projection 14 of the housing 1 a fixing cylindrical boss 15 extending backward. Thus, as shown in FIGS. 2 and 3, a lamp bulb 3, bulb holder 4 and the like, which will be explained later, can be housed inside the fixing boss 15 of the housing 1. Note that, as shown in FIG. 3, there is formed between the inner fixing projection 14 and the outer fixing boss 15 a groove 16 in which the opening end of a cap, which will be explained later, is to be fitted.

In the Figures, the reference numeral 2 indicates a front lens made of a glass or synthetic resin. The front lens 2 is so shaped as to cover the front opening 10 of the housing 1 as shown in FIGS. 2 and 3. The front lens 2 has integrally provided along the rear circumferential edge thereof a sealing projection 20 extending backward. This sealing projection 20 of the front lens 2 is fixed by bonding in the receiving and sealing groove 11 with an adhesive 21 of a hot-melt or similar type. Thus, a lamp chamber 22 is defined by the front lens 2 and housing 1.

In the Figures, the reference numeral 3 indicates a lamp bulb. This lamp bulb 3 is, for example, an H3 type of 12 V, 35 W. The lamp bulb 3 consists, as shown in FIGS. 2 and 3, of a glass bulb 30 enclosing a filament (not shown) therein, a lamp base 31 integrally formed on the rear portion of the glass bulb 30, and a fixing flange 32 provided in the middle portion of the lamp base 31. The fixing flange 32 has formed at the upper and lower edges thereof a square cut 33 and a semicircular cut 34, respectively. A lead wire 70 (for example, positive) is connected at one end thereof to the lamp bulb 3.

In the Figures, the reference numeral 4 indicates a bulb holder. The bulb holder 4 is made of a conductive material, for example, aluminum (or aluminum alloy) by, for example, die casting.

Figure 11:
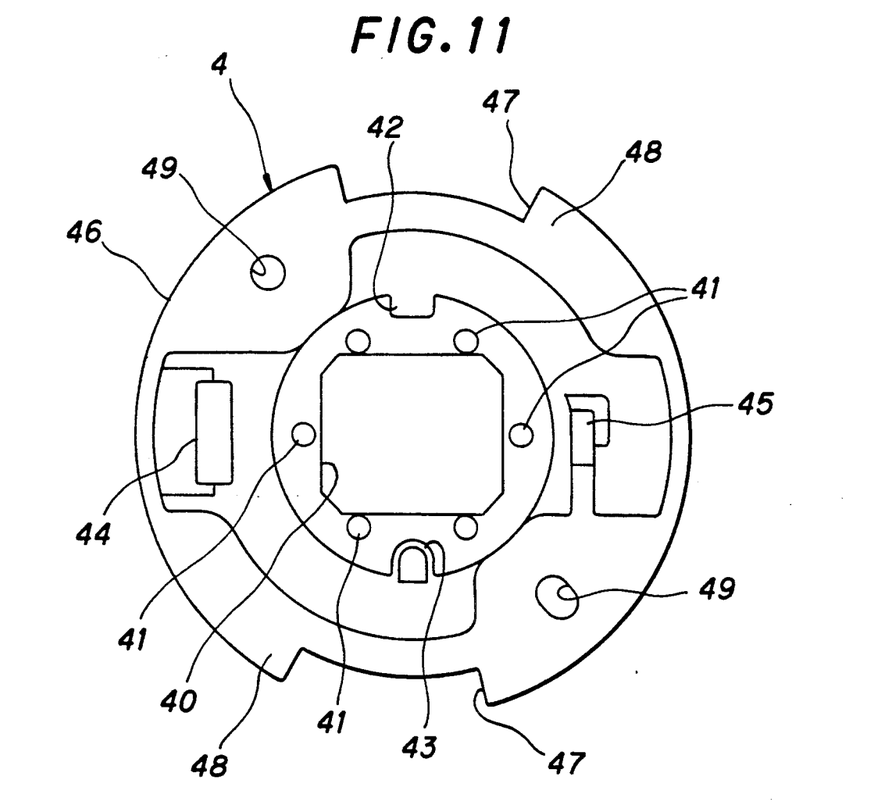
FIG. 11 is a rear view of the bulb holder.

As shown in FIGS. 2, 3, 4 and 11, the bulb holder 4 is a nearly hollow cylinder which is open at one end thereof, has a step at the intermediate portion thereof and is closed at the other end. There is formed in the middle of the closed end of this bulb holder 4 a fixing opening 40 taking the form of a generally octagonal shape formed by trimming the four corners of a rectangle. The bulb holder 4 has provided integrally along the circumferential edge, on one side of the fixing opening 40 in the closed end portion thereof, a plurality of, for example, six small semispheric projections 41. Furthermore, a square projection 42 and a semicircular projection 43 are provided at the upper and lower portions, respectively, and extend from the closed end to the intermediate step of the bulb holder 4. These projections 42 and 43 of the bulb holder 4 take such forms as to fit the cuts 33 and 34, respectively, of the fixing flange 32, thereby preventing the lamp bulb 3 from being incorrectly assembled into the housing 1. Furthermore, there are provided at the left and right sides of the intermediate step of the bulb holder 4 a wire-spring retainer 44 having an L-shaped section and a wire-spring retainer 45 having a hook-shaped section, respectively. A fixing flange 46 is integrally provided as raised from the circumferential edge of the opening in the bulb holder 4. The fixing flange 46 of the bulb holder 4 has formed at the upper and lower portions thereof arc-shaped cuts 47 through which fore-walls 55 of engaging grooves 53 formed in the cap 5, which will be described later, can be inserted and removed. The fixing flange 46 of the bulb holder 4 has engaging projections 48 formed on the circumferential edges thereof opposite to the cuts 47, as shown in FIG. 11. Furthermore, the fixing flange 46 of the bulb holder 4 has formed therein two through-holes 49 for introduction of two screws 17, one being circular and the other being elongated.

Figure 4:
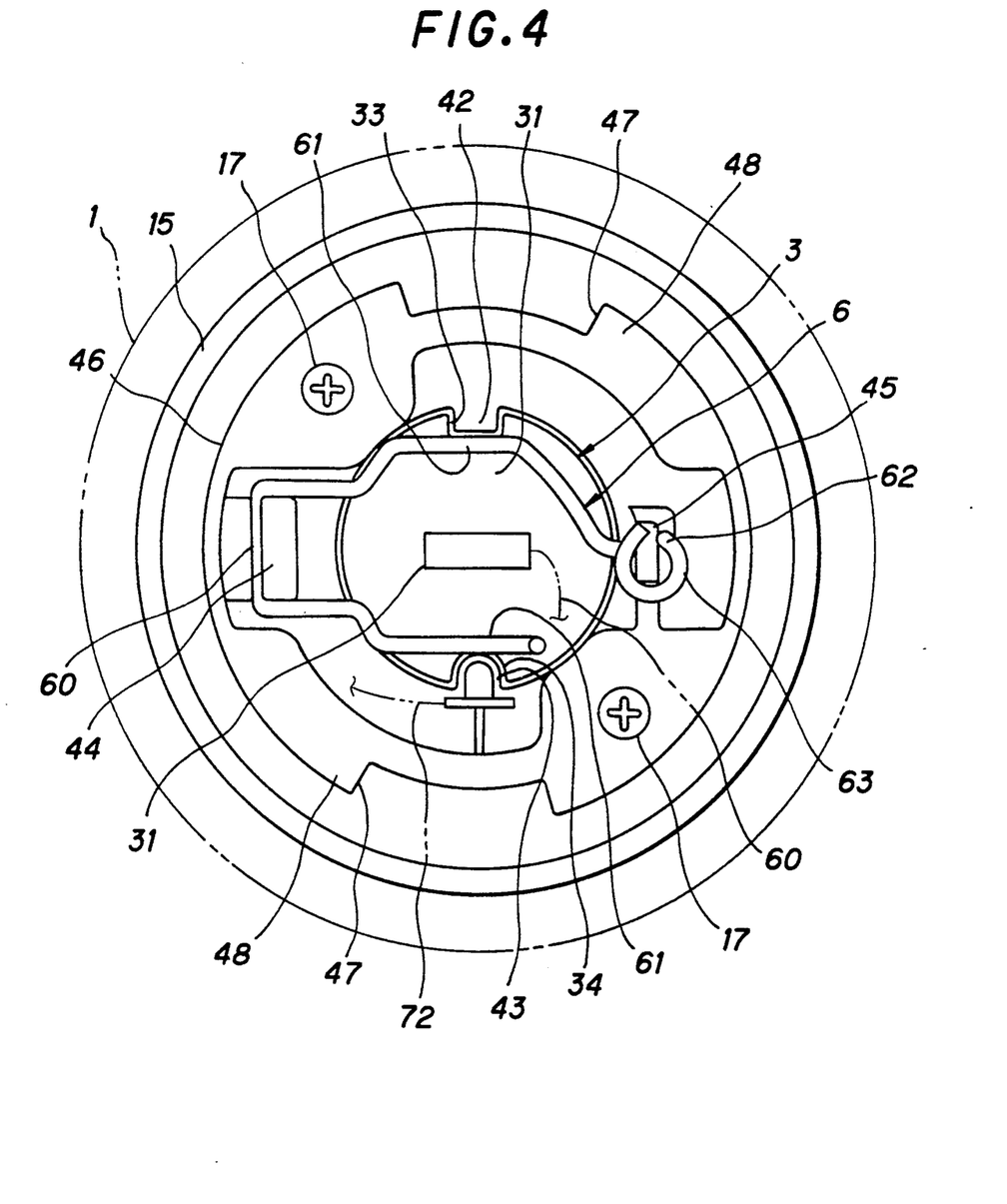
FIG. 4 is a rear view of the rear opening in the housing, bulb holder and lamp bulb with the cap removed.

In the Figures, the reference numeral 6 indicate a wire spring made of, for example, steel. As shown in FIGS. 2, 3 and 4, the wire spring 6 consists of a to-be-fixed, U-shaped part 60 at the nearly intermediate portion of the spring 6, two retaining parts 61 folded in a generally V shape in the same direction from both ends of the part 61, an engaging part 62 resulted by bending one of the two retaining parts 61 into an L shape, and a handling part 63 made by bending the end portion of the engaging part 62 into a generally circular shape.

The to-be-fixed part 60 of the wire spring 6 is pivotably set in the retainer 44 of the bulb holder 4, and the closed end of the bulb holder 4 is inserted through the fixing opening 13 in the housing 1 into the lamp chamber 22. Then, with the fixing flange 46 of the bulb holder 4 applied to the rear end face of the fixing projection 14 of the housing 1, the screw 17 is driven into the bulb holder 4 to secure the bulb holder 4 to the housing 1 and thus the wire spring 6 is pivotably secured to the housing 1 and bulb holder 4.

The lamp bulb 3 is assembled as explained below. First, the wire spring 6 is placed at the open end side of the bulb holder 4 by holding the handling part 63 of the wire spring 6 with the fingers. Next, the glass bulb 30 of the lamp bulb 3 is introduced into the lamp chamber 22 through the fixing opening 40 in the bulb holder 4, and the front side of the fixing flange 32 of the lamp bulb 3 is applied to the projections 41 of the bulb holder 4. In this condition, the retaining parts 61 of the wire spring 6 are forced to the rear side of the fixing flange 32 of the lamp bulb 3 and the engaging part 62 of the wire spring 6 is engaged in the retainer 45 of the bulb holder 4, so that the lamp bulb 3 is position at a predetermined positioned inside the lamp chamber 22, namely, the filament of the lamp bulb 3 is positioned at the focus F of the reflecting surface 12 of the housing 1, whereby the bulb holder 4 is removably held.

In the Figures, the reference numeral 5 indicates the cap. The cap 5 is made of a easy-to-mold synthetic resin such as PP (polypropylene).

Figure 7:
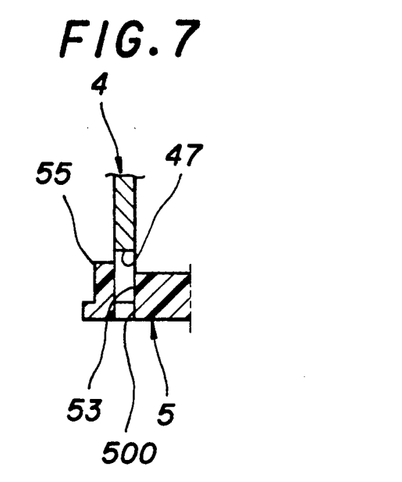
FIG. 7 is a sectional view taken along the line VII—VII in FIG. 5.
Figure 8:
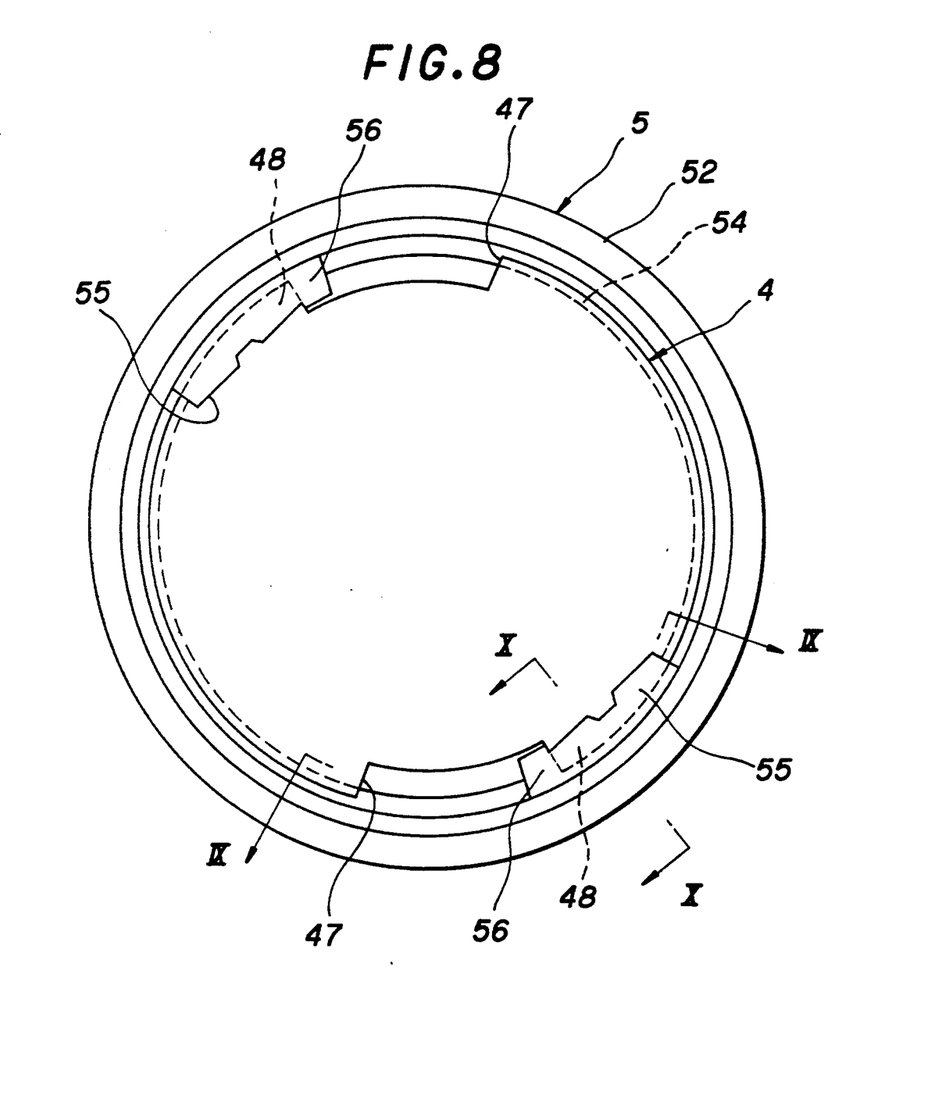
FIG. 8 is an explanatory drawing giving a view from the lens side, showing the state after the cap is secured to the bulb holder.
Figure 9:
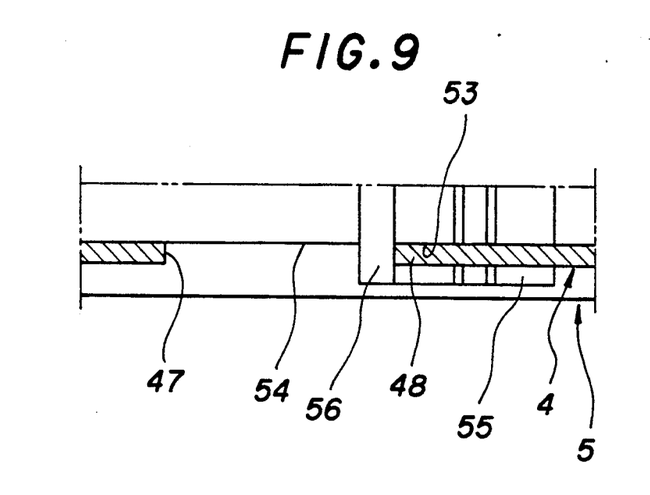
FIG. 9 is a sectional view taken along the line IX—IX in FIG. 8.
Figure 10:
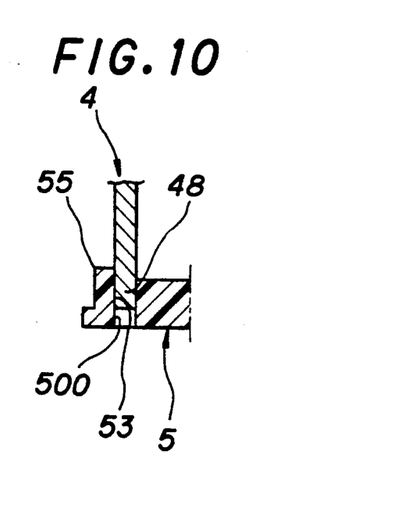
FIG. 10 is a sectional view taken along the line X—X in FIG. 8.
Figure 12:
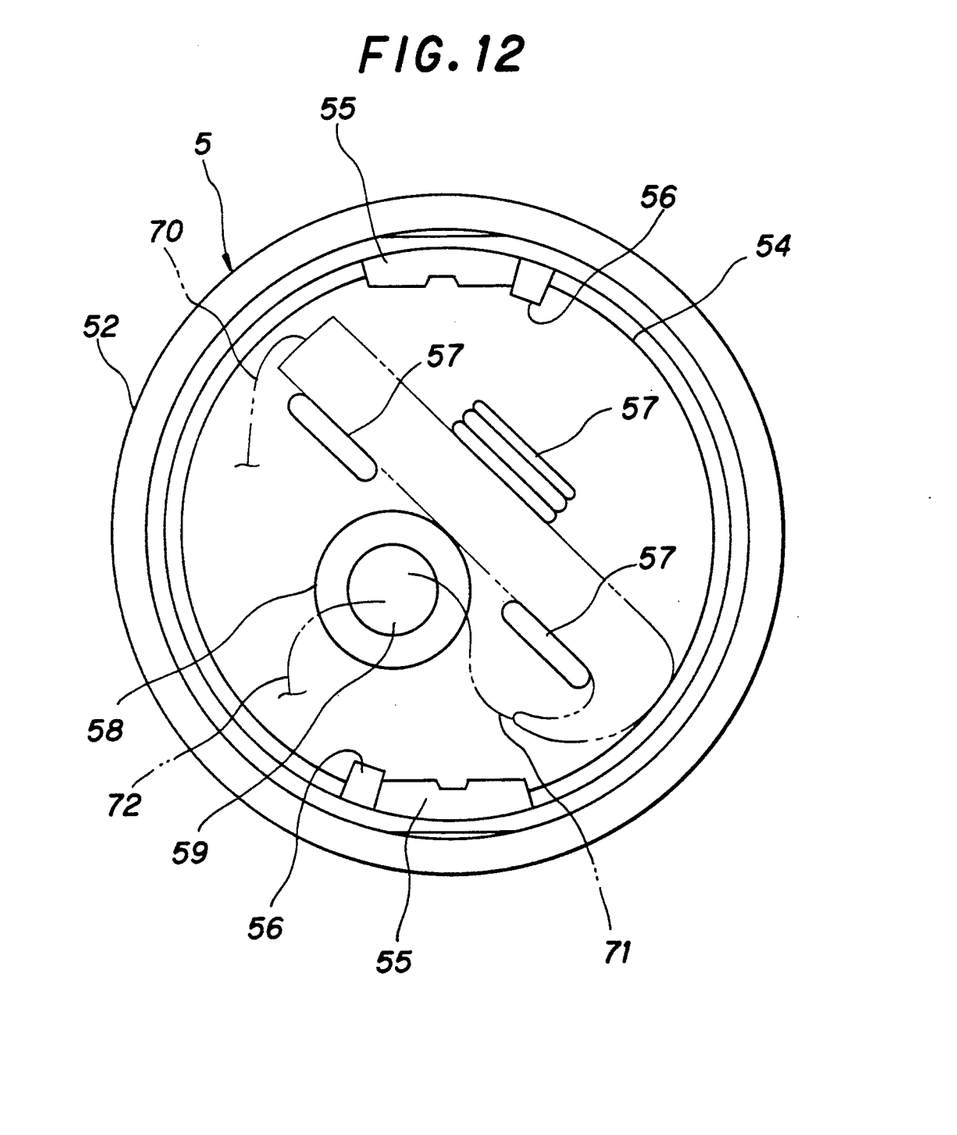
FIG. 12 is a front view of the cap.

As shown in FIGS. 2, 3 and 12, this cap 5 is a hollow cylinder open at one end and closed at the other end. The outside diameter of the open end of the cap 5 is a little smaller than the inside diameter of the fixing boss 15 of the housing 1. The open end of the cap 5 has an O-ring receiving groove 51 provided outside the open end thereof and a flange 52 at a position nearer to the closed end than to the groove 51. An O-ring 50 is fitted in the groove 51 of the cap 5. Two engaging grooves 53 are formed at opposite positions in the inner-circumferential open-end portion of the cap 5. The engaging groove 53 is defined by a circular step 54 provided along the entire inner circumference of the open end of the cap 5 and the fore-wall 55 which is integrally formed circumferentially on the cap 5 at a position nearer to the open end of the cap 5. The engaging groove 53 engages for the thickness of the engaging projection 48 of the bulb holder 4. The fore-wall 55 of the engaging groove 53 has such a shape that it can be freely passed through the cut 47 of the bulb holder 4. A stopper 56 is integrally provided at one end, namely, the clockwise-side end, of the engaging groove 53 as shown in FIG. 12. In FIGS. 3, 7 and 10, the reference numeral 500 indicates a through-hole formed by sliding and extracting a sliding die for molding the engaging groove 53 of the cap 5. Also, there is integrally provided on the closed-end inner wall of the cap 5 a pawl 57 for holding the connection of the lead wires, and further there are provided on the inner wall a groove and through-hole 58 for fixing a grommet. The grommet 59 is fixed by sealing in the groove and through- hole 58.

In the Figures, the reference numerals 71 and 72 indicate a positive lead wire and negative lead wire, respectively, connected at one end thereof to the connector (not shown) of the vehicle lamp. The lead wires 71 and 72 are passed through the grommet 59 of the cap 5, the positive lead wire 71 is connected to the lead wire 70 of the lamp bulb 3, the connection of this lead wire is held by the pawl 57 of the cap 5, and the negative lead wire 72 is connected to the ground potential of the bulb holder 4. When the connector of the lamp bulb is connected to the power connector (not shown), the lamp bulb 3 may be supplied with power.

Figure 5:
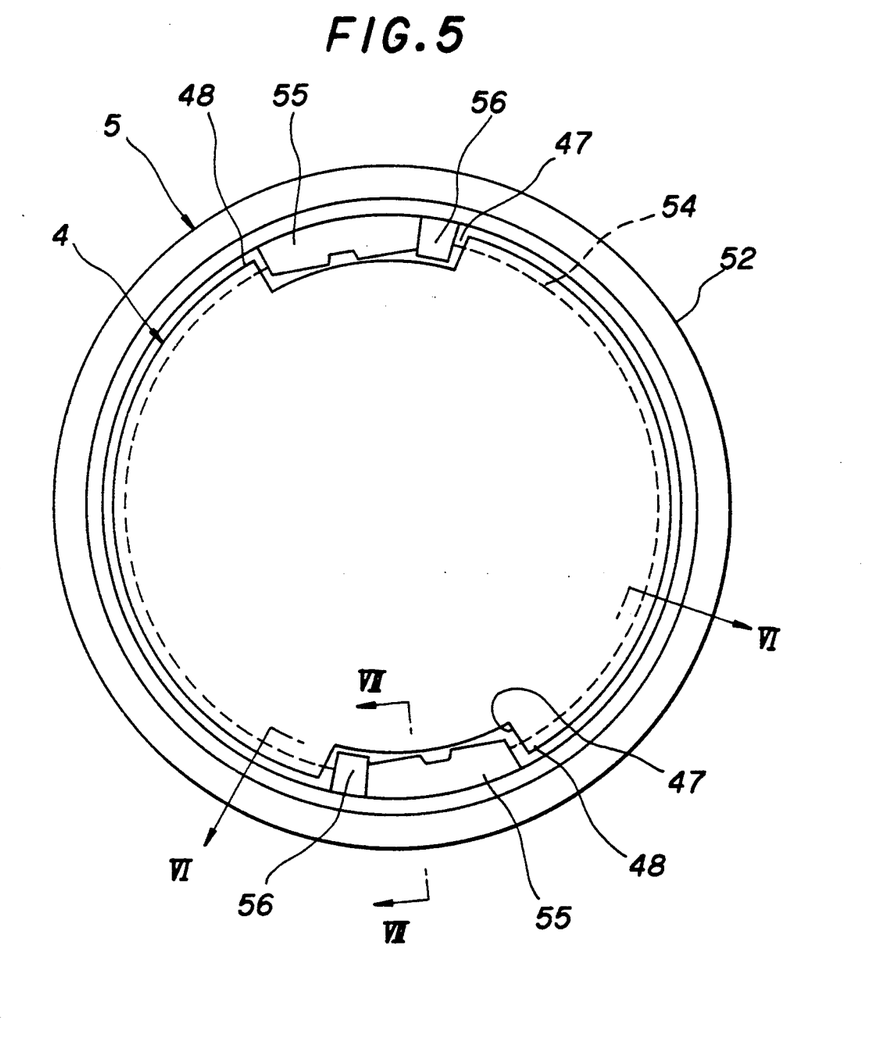
FIG. 5 is an explanatory drawing giving a view from the lens side, showing the state before the cap is secured to the bulb holder.
Figure 6:
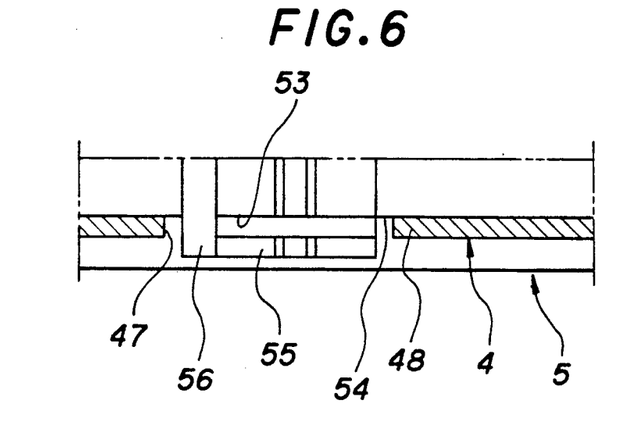
FIG. 6 is a sectional view taken along the line VI—VI in FIG. 5.

The cap 5 is assembled as follows:

As shown in FIGS. 5, 6 and 7, the cut 47 of the bulb holder 4 is first positionally aligned with the fore-wall 55 of the cap 5. Next, the open end of the cap 5 is inserted into the fixing boss 15 of the housing 1, and the fore-wall 55 of the cap 5 is passed through the cut 47 of the bulb holder 1. Then, the cap 5 is turned clockwise in the plane of FIG. 1. The engaging projection 48 of the bulb holder 4 will be engaged in the engaging groove 53 of the cap 5 and the stopper 56 of the cap 5 will abut the end face of the engaging projection 48 of the bulb holder 4. Here the cap 5 has been removably assembled to the bulb holder 4. The O-ring 50 will provide a water-tight seal between the outer circumference of the open end portion of the cap 5 and the inner circumference of the fixing boss 15 of the housing 1. Thus, the cap 5 will cover in a water-tight manner the fixing opening 13 (rear opening) in the housing 1 and the connection of the lead wires 70, 71 and 72.

In the vehicle lamp according to the present invention, the fixing flange 46 at the open end of the bulb holder 4 is provided with the engaging projection 48 for fixing the cap 5. Thus, it is not necessary to provide any engaging groove and projection on the housing 1 and thus no undercut has to be formed in the housing 1. Therefore, the housing 1 can be more easily molded. Also, since the engaging projection 48 of the bulb holder 4 is provided on the fixing flange 46 at the open end of the bulb holder 4, no further groove and projection need be provided on the bulb holder 4. Thus, the bulb holder 4 can be more easily molded, too. Further, because the cap 5 is made of an easily moldable material, it can be molded with no special difficulty whether or not the engaging groove 53 is provided.

Especially in this embodiment, because the heat radiator 82 integrally provided on the bulb holder 4 permits minimizing the difference in temperature between the lamp chamber and the outside of the vehicle lamp, condensation in the vehicle lamp is thereby prevented. The volume of the lamp chamber 22, and in turn, the volume of the entire vehicle lamp can be reduced, accordingly.

Thus, when the lamp bulb 3 lights, the light from the lamp bulb 3 reaches the reflecting surface 12 and is reflected. The reflected light is then projected forward in a predetermined luminous intensity distribution pattern through the front lens 2.

Figure 13:
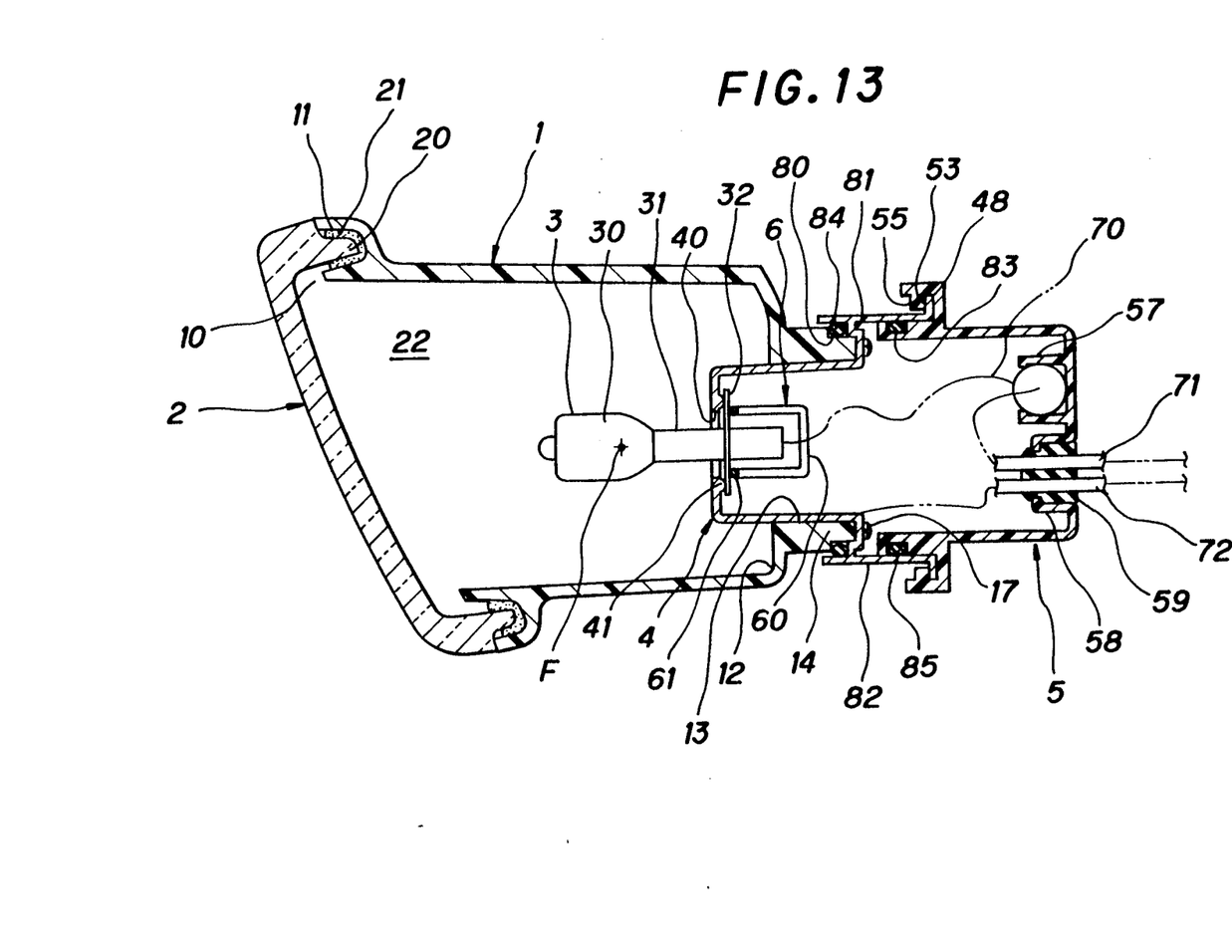
FIG. 13 is an axial sectional view showing a variant of the vehicle lamp according to the present invention.

FIG. 13 is an axial sectional view showing a variant of the vehicle lamp according to the present invention. In this Figure, the same reference numerals as in FIGS. 1 to 12 indicate the same elements as in FIGS. 1 to 12.

The housing 1 in this variant has no fixing boss, but a step 80 for receiving an O-ring is provided along the outer-circumferential rear end portion of the fixing projection 14 of the housing 1. Also, the bulb holder 4 in this variant has an O-ring receiving step 81 provided along the circumferential edge of the fixing flange 46. A cylindrical heat radiator 82 is integrally provided along the circumferential edge of the step 81 of the bulb holder 4. The heat radiator 82 of the bulb holder 4 has provided at the rear end thereof the aforementioned cuts (not shown) and engaging projection 48. Furthermore, the cap 5 in this variant has an open end of which the outside diameter is somewhat smaller than the inside diameter of the heat radiator 82. The cap has an O-ring receiving groove 83 formed in the outer circumference of the open end thereof. The aforementioned engaging groove 53 is provided on the outer circumference of the open end of the cap 5 and at a position in the rear of the groove 83.

In the vehicle lamp according to this variant, an O-ring 84 is received in a space defined by the step 80 of the housing 1, the step 81 of the bulb holder 4 and the front end of the heat radiator 82 to fix the bulb holder 4 to the housing 1. Next, an O-ring 85 is received in the groove 83 of the cap 5, the groove 83 of the cap 5 and an O-ring 85 are introduced inside the rear end of the heat radiator 82, and the engaging groove 53 of the cap 5 is engaged on the engaging projection 48 of the bulb holder 4, whereby the cap 5 can be assembled to the bulb holder 4.

Similar to the previous embodiment, the vehicle lamp according to this variant has no undercut in the housing 1, and the housing 1 can be easily molded accordingly.

If any undercut is provided in the housing 1 when the housing 1 is made of a material not easily heat-deformable, as in the embodiment of the present invention, then it is difficult to mold the housing 1. However, since no undercut is provided in the housing 1 in the present invention, the housing 1 can be easily molded as if it were made of an ordinary synthetic resin.

What is claimed is:

1. A vehicle lamp, comprising a housing having a front opening and a rear opening and a reflector formed integrally therewith, a lens disposed at said front opening of said housing and defining together with said housing a lamp chamber, a bulb holder fixed in said rear opening of said housing, a lamp bulb detachably installed in said bulb holder at a predetermined position inside said lamp chamber and to which lead wires from a power supply are connected, and a water-tight structure including a water-tight cap covering said rear opening of said housing and a connection of said lead wires of said lamp bulb, said bulb holder consisting of a part fixed to said rear opening of said housing, a part detachably fitted to said lamp bulb and a part to which said cap is detachably attached.

2. A vehicle lamp according to claim 1, wherein the water-tight structure is an O-ring interposed between an inner circumference of said rear opening of said housing and an outer circumference of an opening end portion of said cap.

3. A vehicle lamp according to claim 1, wherein said bulb holder is provided with a heat radiator exposed outside said housing and said cap.

4. A vehicle lamp according to claim 3, wherein the water-tight structure comprises O-rings interposed between an outer circumference of said rear opening of said housing and an inner circumference of said heat radiator of said bulb holder and also between an outer circumference of an opening end portion of said cap and an inner circumference of said heat radiator of said bulb holder.

5. A vehicle lamp according to claim 1, wherein said housing is made of a material not easily heat-deformable.

6. A vehicle lamp according to claim 2, wherein said housing is made of a material not easily heat-deformable.

7. A vehicle lamp according to claim 3, wherein said housing is made of a material not easily heat-deformable.

8. A vehicle lamp according to claim 4, wherein said housing is made of a material not easily heat-deformable.

* * * * *